United States Patent
Kameyama et al.

(10) Patent No.: US 8,171,355 B2
(45) Date of Patent: May 1, 2012

(54) DATA TRANSFERRING METHOD, AND COMMUNICATION SYSTEM AND PROGRAM APPLIED WITH THE METHOD

(75) Inventors: Hiroaki Kameyama, Kawasaki (JP); Yuichi Satou, Kawasaki (JP); Takehiko Fujiyama, Kawasaki (JP); Yuuichi Terui, Kawasaki (JP); Kaname Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1361 days.

(21) Appl. No.: 11/490,017

(22) Filed: Jul. 21, 2006

(65) Prior Publication Data

US 2007/0260850 A1    Nov. 8, 2007

(30) Foreign Application Priority Data

Mar. 17, 2006   (JP) .................... 2006-74263

(51) Int. Cl.
*H03M 13/35* (2006.01)
(52) U.S. Cl. ........................ 714/708; 714/774
(58) Field of Classification Search ................. 714/774, 714/776, 708
See application file for complete search history.

(56) References Cited

U.S. PATENT DOCUMENTS

| | | | | |
|---|---|---|---|---|
| 5,699,364 A * | 12/1997 | Sato et al. | ...................... | 714/708 |
| 5,699,365 A * | 12/1997 | Klayman et al. | ............. | 714/708 |
| 6,012,159 A * | 1/2000 | Fischer et al. | ................ | 714/755 |
| 6,278,716 B1 * | 8/2001 | Rubenstein et al. | .......... | 370/432 |
| 6,307,487 B1 | 10/2001 | Luby | | |
| 6,314,535 B1 * | 11/2001 | Morris et al. | ................. | 714/708 |
| 6,411,223 B1 | 6/2002 | Haken et al. | | |
| 6,516,435 B1 * | 2/2003 | Tsunoda | ....................... | 714/751 |
| 6,570,843 B1 * | 5/2003 | Wolfgang | ..................... | 370/216 |
| 6,609,223 B1 * | 8/2003 | Wolfgang | ..................... | 714/752 |
| 6,675,340 B1 * | 1/2004 | Hardie et al. | ................. | 714/751 |
| 6,697,985 B1 * | 2/2004 | Ilani | ............................. | 714/751 |
| 6,721,919 B1 * | 4/2004 | Morioka et al. | .............. | 714/801 |
| 6,856,263 B2 * | 2/2005 | Shokrollahi et al. | ........... | 341/50 |
| 7,068,729 B2 * | 6/2006 | Shokrollahi et al. | .......... | 375/296 |

(Continued)

FOREIGN PATENT DOCUMENTS

EP    1 168 732 A1    1/2002

(Continued)

OTHER PUBLICATIONS

Chinese Office Action issued Apr. 8, 2009 in corresponding Chinese Patent Application 200610115795.6.

(Continued)

*Primary Examiner* — Stephen Baker
(74) *Attorney, Agent, or Firm* — Fujitsu Patent Center (57) ABSTRACT

Disclosed is a communication system that transmits data through a transmission path between a transmission side apparatus and a reception side apparatus, wherein the transmission side apparatus comprises a coding apparatus that creates redundantly-coded data from original data; a transmitting apparatus that sends the coded data coded by the coding unit to the transmission path; and a coding rate determining apparatus that sets and controls a coding rate in the coding unit, wherein the reception side apparatus comprises a receiving apparatus that receives the coded data sent through the transmission path; a decoding apparatus that decodes the original data from the coded data received; and a loss rate estimating apparatus that measures the loss rate on the path of the coded data sent, and wherein the coding rate determining apparatus of the transmission side apparatus varies and controls the coding rate in the coding apparatus based on the loss rate obtained.

10 Claims, 6 Drawing Sheets

U.S. PATENT DOCUMENTS

| | | | |
|---|---|---|---|
| 7,095,729 B2 * | 8/2006 | Sachs et al. | 370/341 |
| 7,304,990 B2 * | 12/2007 | Rajwan | 370/389 |
| 7,447,235 B2 * | 11/2008 | Luby et al. | 370/476 |
| 7,472,334 B1 * | 12/2008 | Scott et al. | 714/785 |
| 7,533,324 B2 * | 5/2009 | Fischer et al. | 714/776 |
| 7,734,946 B2 * | 6/2010 | Kobayashi | 714/4.1 |
| 8,006,160 B2 * | 8/2011 | Chen et al. | 714/752 |
| 2002/0136164 A1 | 9/2002 | Fukuda et al. | |
| 2005/0195755 A1 | 9/2005 | Senta et al. | |

FOREIGN PATENT DOCUMENTS

| | | |
|---|---|---|
| JP | 07-123043 | 5/1995 |
| JP | 08-265304 | 10/1996 |
| JP | 2000-115238 | 4/2000 |
| JP | 2001-230809 A | 8/2001 |
| JP | 2004-215224 A | 7/2004 |
| JP | 3836858 | 8/2006 |
| WO | 91/17503 | 11/1991 |
| WO | WO 2004/030273 | 4/2004 |

OTHER PUBLICATIONS

Yosuke Senta, et al. "Computer Environment and Data Sharing using DirectShare", "Ubiquitous Computing System Workshop, Information Processing Society of Japan, Reference for Presentation." Nov. 19, 2003.

Yosuke Senta, et al. Information Sharing System by P2P, $32^{ND}$ MBL/ $7^{th}$ UBI Joint Presentation of studies Mar. 2005.

Yosuke Senta, et al. "Direct Share Information using P2P" HCI International Jul. 2005 pp. 22-27.

Japanese Notification of Reason for Rejection, English-language translation, mailed Jan. 5, 2011 for corresponding Japanese Application No. 2006-074263.

Japanese Office Action, mailed Aug. 17, 2010, in corresponding JP Patent Application 2006-074263. Partial English translation.

* cited by examiner

DATA TRANSFERRING METHOD, AND COMMUNICATION SYSTEM AND PROGRAM APPLIED WITH THE METHOD

CROSS-REFERENCE TO RELATED APPLICATIONS

This application is based upon and claims the benefit of priority from the prior Japanese Patent Application No. 2006-74263, filed on Mar. 17, 2006, the entire contents of which are incorporated herein by reference.

BACKGROUND OF THE INVENTION

1. Field of the Invention

The present invention relates especially to a data transferring method for data transferring between data processing apparatuses connected mutually through a network, and to a communication system and a program that are applied with the method.

2. Description of the Related Art

In a network such as the Internet or an intranet, etc., when data are transmitted at a processing speed exceeding the processing speed of a relaying/processing apparatus, the data that can not be processed are lost. Such a state is referred to as "congestion state". When congestion has occurred, the congestion will be made worse if additional data are further transmitted.

According to TCP (Transmission Control Protocol) that is a protocol used generally in data communication, the amount of data that can be transmitted together at one time by the transmitting side is provided corresponding to the size of a window.

The transmitting side does not transmit the succeeding data until the transmitting side receives an acknowledgment of reception of the data from the receiving side. Therefore, the communication performance is degraded.

According to TCP, as a measure against congestion, A method is taken that the amount of data to be transmitted together at one time is made small at the start of communication by setting the size of a window to be small and, when a response has arrived from the receiving side, the amount of the data to be transmitted is increased by enlarging the size of the window gradually. This method is referred to as "slow start".

When RTT (Round Trip Time) that corresponds to the distance between networks is small, communication is recovered soon even when the size of the window is made small. However, when RTT is large, a problem has arisen that the transfer speed is remained to be slow because the size of the window can not be recovered so soon.

For the above technical problem, various suggestions have been presented that improve efficiency from the viewpoint of coding.

As a first conventional technique, an invention described in Japanese Patent Application Laid-Open Publication No. 1995-123043 can be listed. This invention selects and varies an appropriate coding scheme or a coding rate without degrading the efficiency even when the state of a transmission path is changed often.

As a second conventional technique, an invention described in Japanese Patent Application Laid-Open Publication No. 1996-265304 can be listed. This invention is a method that prevents degradation of the transmission efficiency and prevents increase of the communication time by switching the error control scheme in response to the change of the line state of a wireless line. However, according to this method, data are transmitted according to two (2) or more coding schemes, error detection is executed to each of the results of decoding, and the decoding result from which no error has been detected is accepted as the correct information. Therefore, a problem has arisen that the amount of transmission becomes large.

To solve the problems caused based on RTT in the above TCP communication, the inventors, etc., of the present invention have suggested to transfer data at a high speed by transmitting a packet in UDP (User Datagram Protocol) that uses no response (ACK) from the receiving side and repairing packet loss by FEC (Forward Error Correction), in a previous Japanese Patent Application Laid-Open Publication No. 2004-539446; "Carrying of a Computer Work Environment and Sharing of Data by DirectShare", Ubiquitous Computing System Workshop, Information Processing Society of Japan, Reference for Presentation in November 2003; "P2P-type Information Sharing System-DirectShare-", 32nd MBL/7th Joint Presentation of Studies, Reference for Presentation in March 2005; and "DirectShare: Information Sharing system using P2P", HCI International, 2005, 22-27, Jul. 2005, Las Vegas.

The above suggestions by the inventors, etc., employ FEC that can code and decode at a high speed with simple calculation and small amount of memory.

Figure 1:
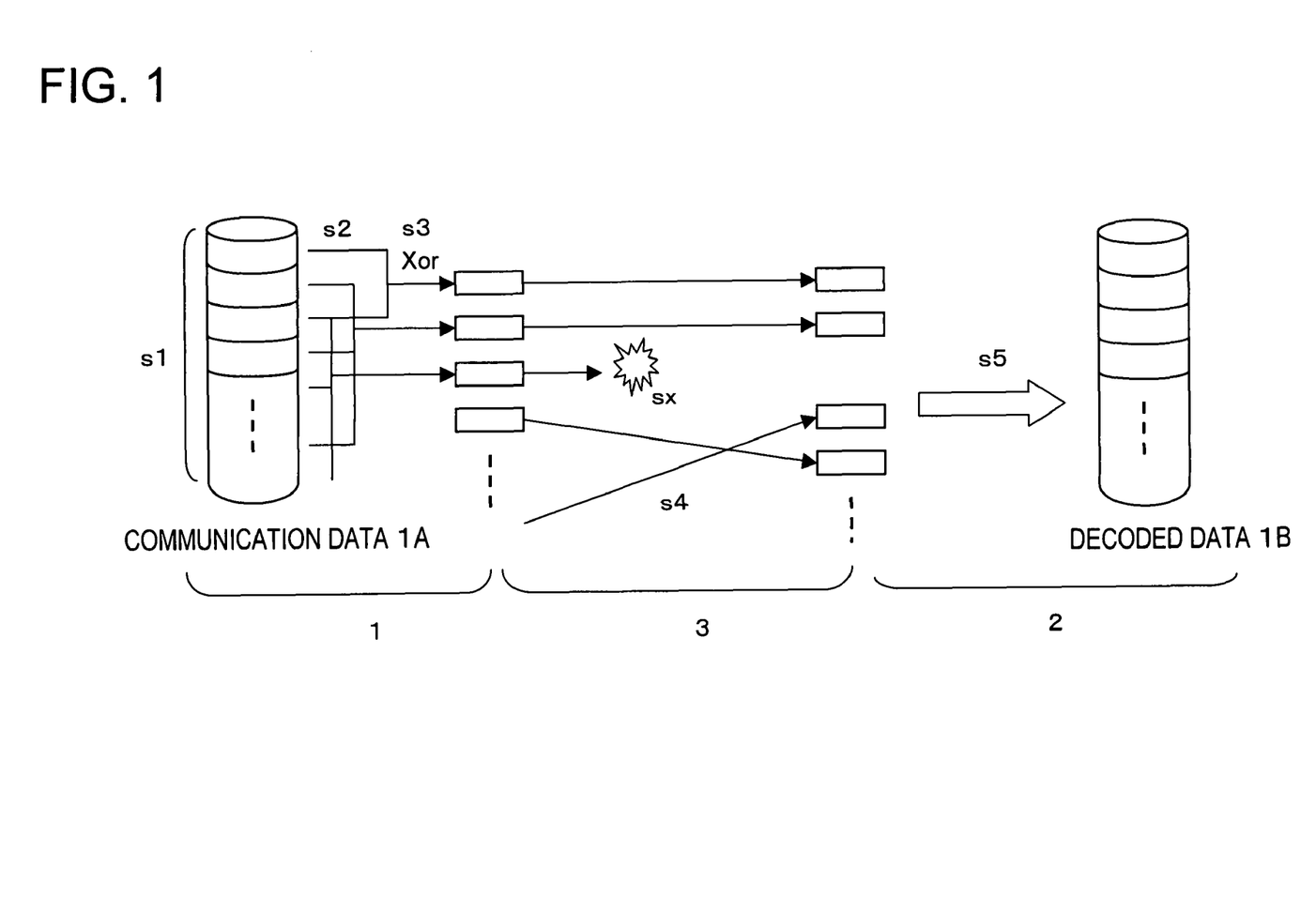
FIG. 1 is an schematic explanatory view of FEC in a previous suggestion.

The overview of the FEC in the above suggestions will be described referring to FIG. 1. Data 1A to be transmitted from a transmission side apparatus 1 through a communication path 3 to a reception side apparatus 2 are divided into small blocks (s1). Appropriate combinations are created from the divided blocks (s2). Among the combinations, X or (exclusive OR) is calculated (s3). The calculated data are transmitted together with information on the combinations (s4).

At this time, a case where data are lost (sx) on the communication path 3 can be considered.

By applying the Gaussian elimination to the information on the combination (s5), decoded data 1B corresponding to the original data can be obtained from the data received at the data reception side apparatus 2.

A coding system is characterized in that, by transmitting excessively the data to be transmitted by several percents in using FEC, even when any of packets is lost on the communication path 3 (s4), the original data can be recovered or corrected from the packets that can be received. Such a coding system is referred to as RPS (Random Parity System).

The line state of the network may be degraded suddenly and may not be constant due to the time of day and other factors. In the congestion control like the "slow start" of TCP, a problem has arisen that lines can not be utilized effectively.

SUMMARY OF THE INVENTION

It is therefore an object of the present invention to provide a data transferring method that enables lost data to be corrected and transmission to be continued until the original data can be recovered with the amount of data remained constant even when the line state is degraded, and a communication system and a program that are applied with the method.

Another object of the present invention is to provide a data transferring method that enables the above RPS to be corresponded dynamically with the line state and the decoding success rate to be improved, and a communication system and a program that are applied with the method.

In order to achieve the above objects, according to a first aspect of the present invention there is provided a communication system that transmits data through a transmission path between a transmission side apparatus and a reception side apparatus, wherein the transmission side apparatus comprises a coding apparatus that creates redundantly-coded data from original data; a transmitting apparatus that sends the coded data coded by the coding unit to the transmission path; and a coding rate determining apparatus that sets and controls a coding rate in the coding unit, wherein the reception side apparatus comprises a receiving apparatus that receives the coded data sent through the transmission path; a decoding apparatus that decodes the original data from the coded data received; and a loss rate estimating apparatus that measures the loss rate on the path of the coded data sent, and wherein the coding rate determining apparatus of the transmission side apparatus varies and controls the coding rate in the coding apparatus based on the loss rate obtained.

In the first aspect, the coding rate determining apparatus of the transmission side apparatus obtains the solutions by substituting the original data together with predetermined constant data in simultaneous equations of the Boolean algebra, determines the combination of the constant data and the solutions to be coded data, and the decoding apparatus of the reception side apparatus decodes the original data by substituting the constant data and the solutions obtained from the received coded data in the simultaneous linear equations.

In the first aspect, the coding rate determining apparatus of the transmission side apparatus varies and controls the coding rate of the coded data coded by the coding apparatus by varying the length of a bit string created from the number of the coded data or the original data and used for the coding.

As to the coding rate determining apparatus of the transmission side apparatus, when the loss rate measured by the loss rate estimating apparatus is equal to or smaller than a predetermined value, the coding rate determining apparatus varies and controls the number of the coded data in a manner the number is increased.

A second and a third aspects of the present invention that achieve the above objects are a data transferring method and a program that respectively causes the transmission side apparatus to execute a step of obtaining the solutions by substituting the original data together with the predetermined constant data in the simultaneous equations of the Boolean algebra and packet-transmitting the combination of the constant data and the solutions as the coding data to the reception side apparatus, and causes the reception side apparatus to execute a step of decoding the original data by substituting the constant data and the solutions obtained from the received coded data in the simultaneous linear equations; that further execute a step of causing the reception side apparatus to obtain the loss rate of the received coded data on the transmission path and a step of causing the transmission side apparatus to vary and control the coding rate of the coded data based on the obtained loss rate.

BRIEF DESCRIPTION OF THE DRAWINGS

The above and other objects, aspects, features and advantages of the present invention will become more apparent from the following detailed description when taken in conjunction with the accompanying drawings, in which.

DESCRIPTION OF THE PREFERRED EMBODIMENTS

Referring to the accompanying drawings, an exemplary embodiment of the present invention will be described below.

The example of the embodiment is described for understanding of the present invention and the technical scope of the present invention is not limited to the example.

Figure 2:
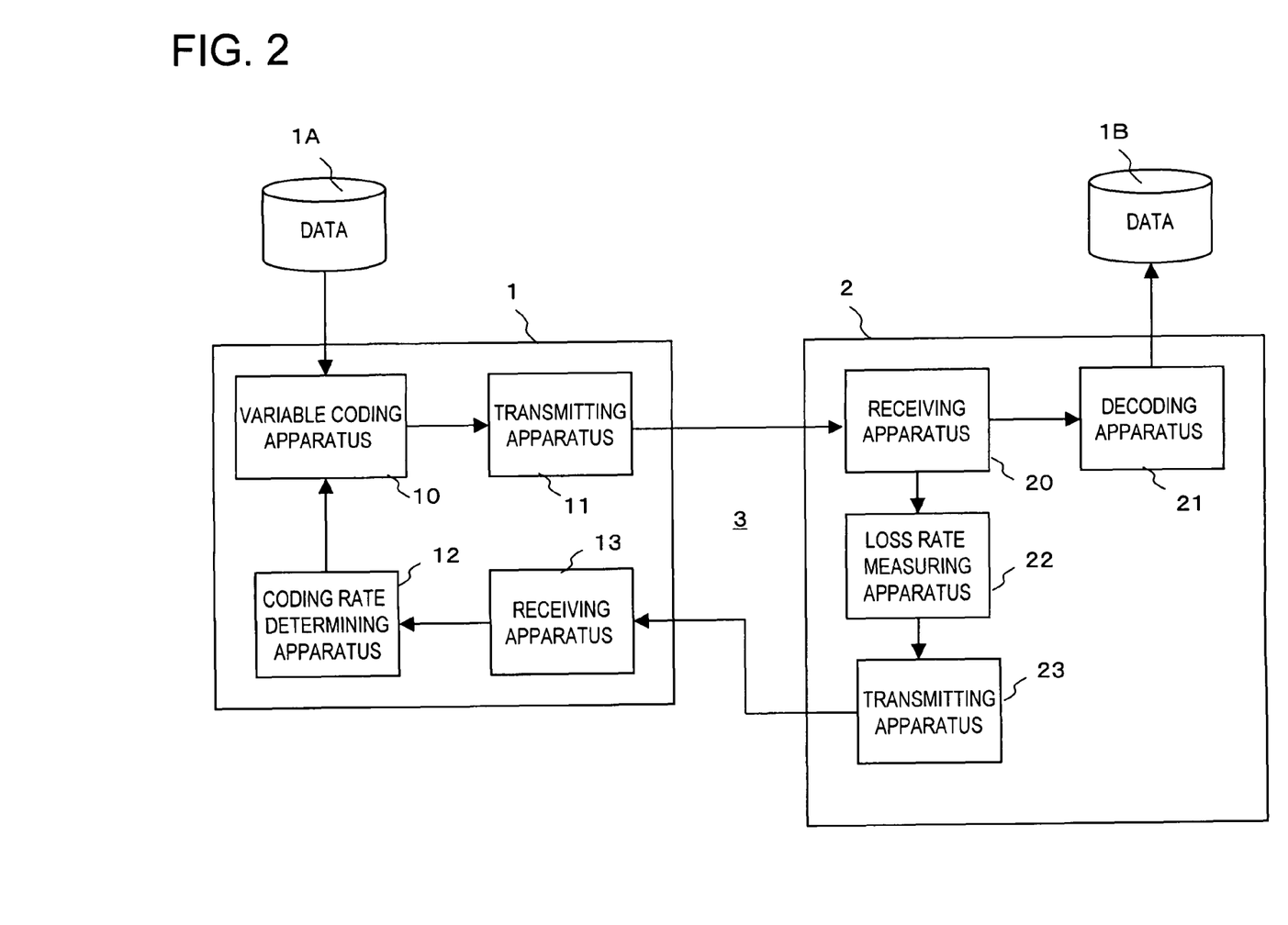
FIG. 2 schematically shows the configuration of a communication system that is applied with the data transferring method according to the present invention.

FIG. 2 schematically shows the configuration of a communication system that is applied with the data transferring method according to the present invention.

At a transmission side apparatus 1, data 1A to be transmitted are coded by a variable coding apparatus 10. In this coding, a parameter for coding determined by a coding rate determining apparatus 12 according to a method described later is used.

The data coded by the variable coding apparatus 10 are transmitted to a reception side apparatus 2. In the reception side apparatus 2, a receiving apparatus 20 receives the coded data and leads the data to a decoding apparatus 21, and recovery of data 1B to be received corresponding to the data 1A to be transmitted on the transmitting side is executed.

The data received by the receiving apparatus 20 is sent to a loss rate measuring apparatus 22. The number of data lost on a transmission path 3 is obtained by the loss rate measuring apparatus 22 and the result thereof is transmitted by a transmitting apparatus 23 to the transmission side apparatus 1.

On the transmission side, the coding rate determining apparatus 12 determines a coding parameter value based on the loss rate received by a receiving apparatus 13.

In the present invention, the data communicating method that uses RPS which has been presented in the above applications filed by the inventors, etc., and is schematically described above is used as a code for which the coding rate of the variable coding apparatus 10 is variable. Though the RPS is described in detail in the above applications, for further understanding of the present invention, the data communicating method using RPS executed at the variable coding apparatus 10 and the principle thereof will be described below.

Data transfer of m=4 (four) bits is taken as an example.

This principle is based on the solution of simultaneous equations of the Boolean algebra. Assuming that the original data 1A to be transferred are $(b_0, b_1, b_2, b_3)$ that are m-bit data, the solution of the following simultaneous equations are obtained using $(k_{n0}, k_{n1}, k_{n2}, k_{n3})$ as a data string $K_{nm}$ having appropriate m bits and n series.

$$b_0 k_{n0} + b_1 k_{n1} + b_2 k_{n2} + b_3 k_{n3} = p_n \qquad (1)$$

The solution $P_n$ is $P_n = P_0, P_1, P_2, P_3, \ldots P_{n-1}$ where n is an integer equal to or larger than m, that is n=0, 1, 2, . . . .

The combination of the data string $K_{nm}$ and the solution $P_n$ of the simultaneous equations is consecutively transmitted as packets. That is, n packets $K_p = (K_0 p_0, K_1 p_1, K_2 p_2, \ldots, K_n p_s)$ are transmitted.

The reception side apparatus 2 recovers the m-bit original data $(b_0, b_1, b_2, b_3)$ by solving the simultaneous equations of Equation (1) by substituting m-bit data series $K_{nm} = (k_{n0}, k_{n1}, k_{n2}, k_{n3})$ and the solution $Pn = (P_0, P_1, P_2, P_3)$ obtained from the received packets $K_p = (K_0 p_0, K_1 p_1, k_2 p_2, \ldots, K_n p_s)$ in Equation (1).

Figure 3:
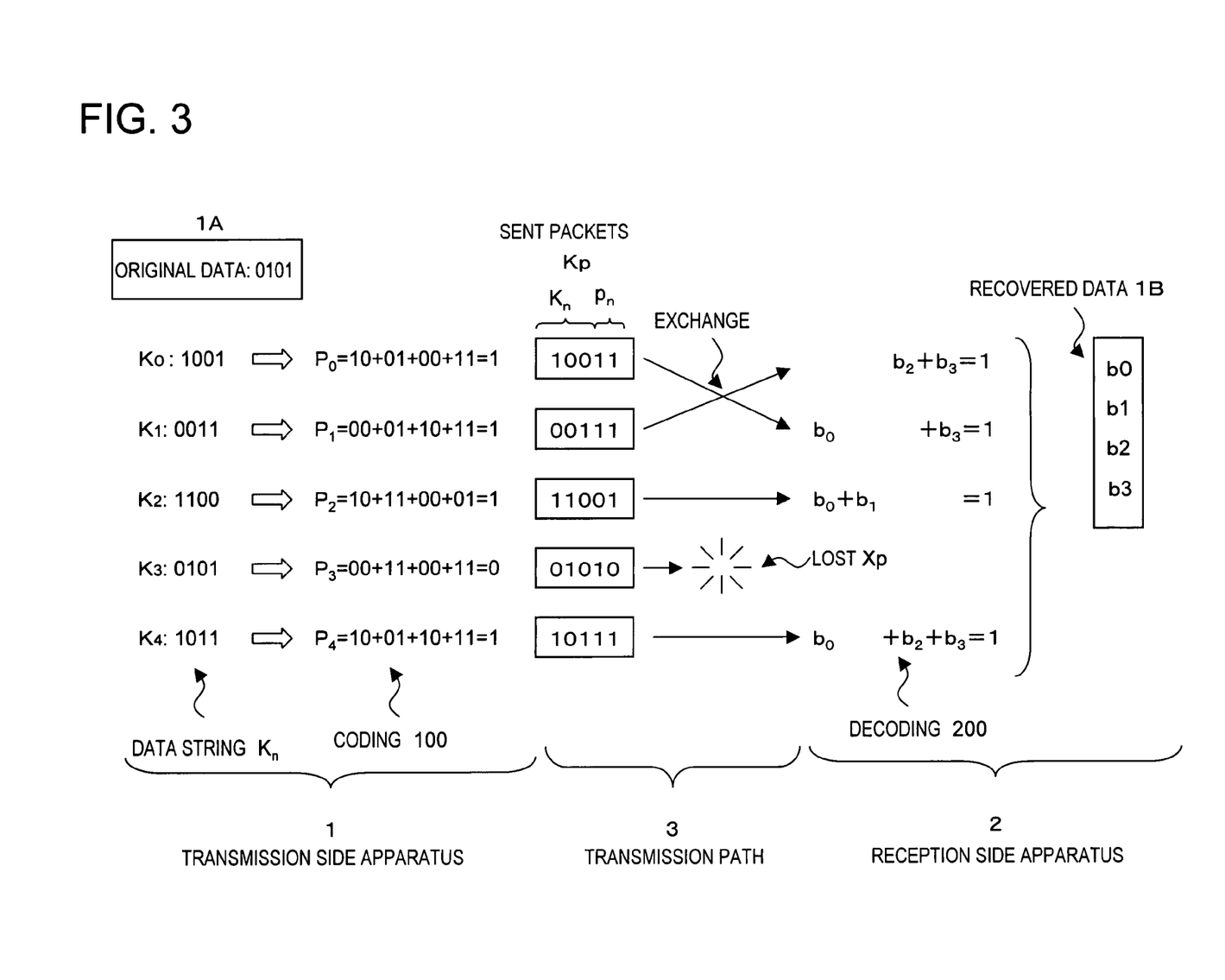
FIG. 3 is an explanatory view for the case where binary data "0101" are transmitted using the coding principle in the previous suggestion as original data 1A.

As the example shown in FIG. 3, the case is taken where binary data "0101" are transmitted as the original data 1A. In this case, the following is defined as the data string $K_n$.

$K_0 = 1001$
$K_1 = 0011$
$K_2 = 1100$
$K_3 = 1100$
$K_4 = 1010$

A coding process 100 is executed by substituting the original data 1A and the data string $K_n$ in the simultaneous equation of Equation (1). This coding process 100 obtains the solution $P_n = (P_0, P_1, P_2, P_3, P_4)$ by adding the logical products of the terms.

As shown for the transmission path 3, by the coding to obtain the solution of the simultaneous equations, the combination of the data string $K_p$ and the solution $P_n$ obtained by the coding process 100 is made into five (5) packets $K_0p_0$, $K_1p_1$, $K_2p_2$, $K_3p_3$, $K_4p_4$ and transferred toward the reception side apparatus 2.

In the example shown in FIG. 3, for the transmission path 3, for example, it is assumed that a first packet and a second packet are exchanged and a fourth packet is lost $X_p$.

The reception side apparatus 2 executes a decoding process 200 that validates a data bit corresponding to a bit 1 in the data string $K_n$ of the received packets $K_0p_0$, $K_1p_1$, $K_2p_2$, $K_3p_3$, $K_4p_4$ and creates simultaneous equations and solves the equations using the Gaussian elimination that eliminates a data bit corresponding to a bit 0.

By solving the simultaneous equation created by this decoding process 200, the recovered data 1B that defines that 4-bit data $(b_0, b_1, b_2, b_3)=(0101)$ can be obtained.

The calculation of the simultaneous equations of Equation (1) that is the coding process 100 in the transmitting apparatus 1 can be solved very quickly by a computer process because only counting the number of "1s (ones)", that is, observing the parity bits has to be executed after executing logical multiplication (AND) of each bit $b_n$ and each data string $K_n$ in the Boolean algebra.

The process 200 that solves the simultaneous equations in the reception side apparatus 2 can also be executed quickly using "exclusive OR (Xor)".

Assuming that the original data 1A are divided into a plurality of pieces, the number of pieces divided when a plurality of blocks of the data string $K_p$ is "n", and that the number of the coded data created by the RPS coding is "m", the redundancy degree of the number of the coded data to the original data 1A can be represented as m/n.

Measurement was conducted based on the recognition of the inventors that, in the RPS coding, the tolerance against loss of data can be varied by varying the number of coded data to be created and the length of the bit string (code length) used in the coding.

Figure 4:
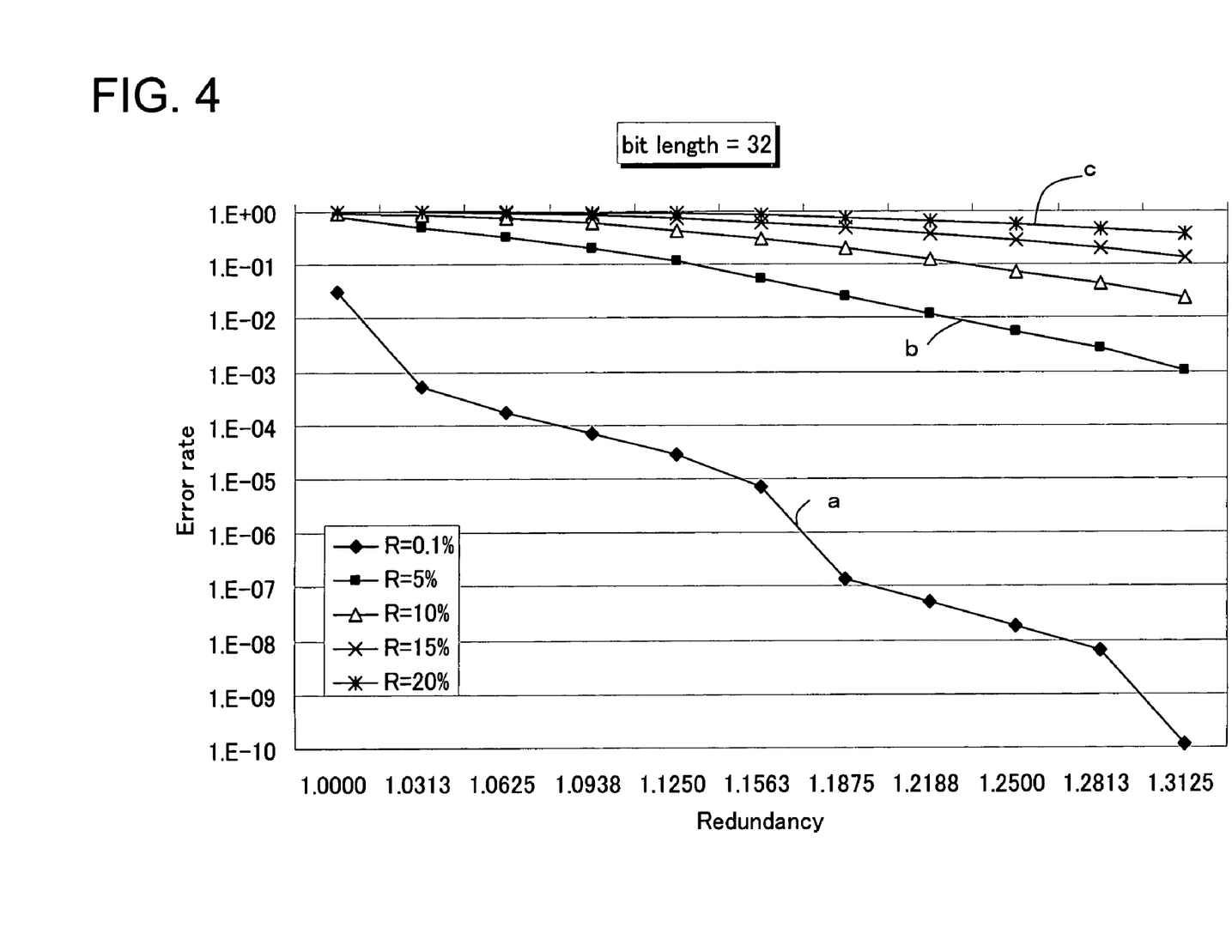
FIG. 4 is a graph showing the relation between the number of coded data and the decoding success rate.

FIG. 4 is a graph showing the relation between the number of coded data and the decoding success rate obtained when the code length is fixed to be 32 bits while the number of coded data to be created is being increased.

When the data loss rate on the transmission path 3 is, for example, 0.1% (Graph a), the probability of successful decoding can be improved by increasing the number of coded data to be created (that is, increasing the redundancy degree).

However, it could be confirmed that the probability of successful decoding is not significantly varied even though the redundancy degree is made 1.3 time as large when the loss rate is 5% (Graph b) and 20% (Graph c).

Figure 5:
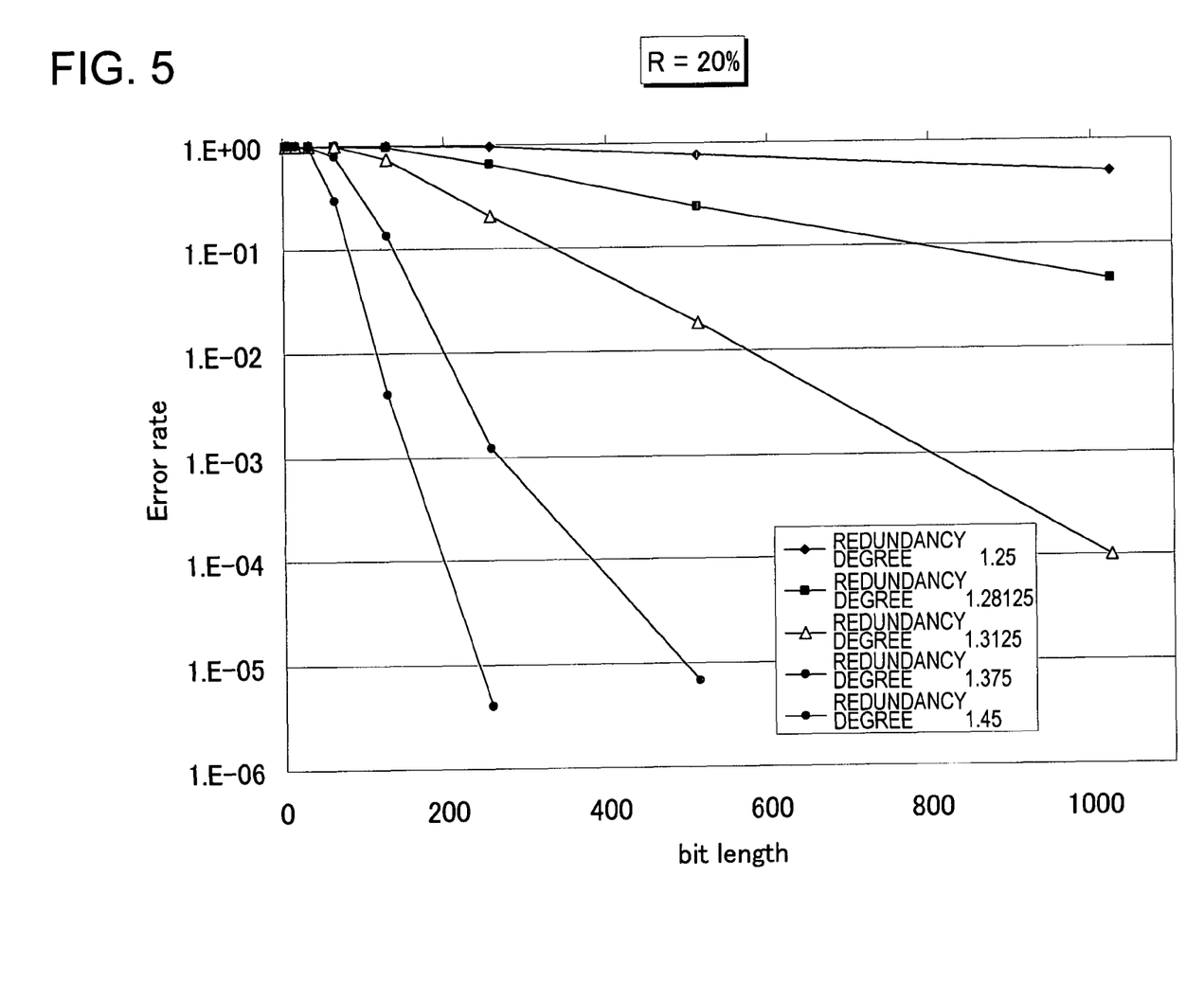
FIG. 5 shows the relation between the code length and decoding success rate.

FIG. 5 shows the measurement result obtained when the loss rate is fixed to be 20% and the code length and the redundancy degree are varied, that is the relation between the code length and the decoding success rate.

In FIG. 5, the axis of abscissas represents the code length and the axis of coordinate represents the probability that decoding is failed. From the measurement result shown in FIG. 5, it was confirmed that, as the code length becomes longer, the probability of successful decoding becomes higher even for a same redundancy degree.

From the above confirmation, the inventors have recognized that, in the RPS coding, efficient data transmission is enabled by coping with data loss by increasing the number of created coded data when the loss rate is small and coping with data loss by increasing the code length when loss rate has become large.

Therefore, according to the present invention, in the system configuration of FIG. 2, the received signal to be received is received in the receiving apparatus 20 in the reception side apparatus 2, the loss rate (loss percentage) is obtained by the loss rate measuring apparatus 22, and the obtained loss rate is transmitted to the transmission side apparatus 1.

When the transmission side apparatus 13 has received the loss rate, the value is sent to the coding rate determining apparatus 12. The coding rate determining apparatus 12 increases the number of the created coded data based on the loss rate, that is, the redundancy degree is increased and, when the loss rate has exceeded a predetermined threshold value, controls the variable coding apparatus 10 to increase the code length.

The important point is how to obtain the loss rate on the transmission path 3 of the data.

Figure 6:
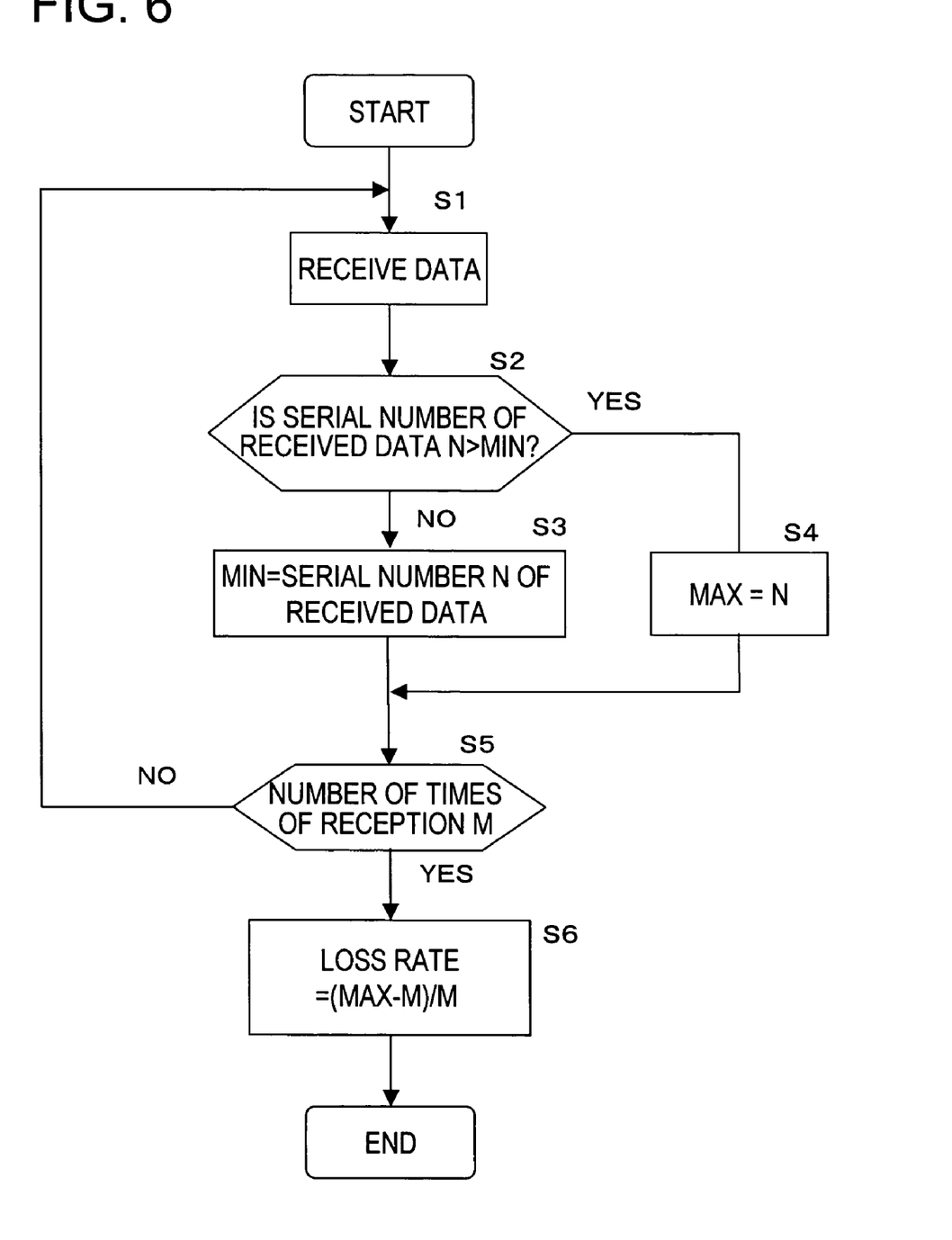
FIG. 6 is a flow of an example of a method according to the present invention for obtaining the loss rate.

FIG. 6 is a flow of an example of a method according to the present invention for obtaining the loss rate.

For example, a serial number N is given to each of the data to be transmitted. The number of data used for measurement is set to be "M" in the receiving apparatus 20 in the reception side apparatus 2.

When a datum has been received (step S1), the serial number N of the received datum is compared with a minimum value MIN (step S2). When the serial number N of the received datum is not larger than the minimum value MIN, the serial number is stored as the minimum value (step S3).

When the serial number N of the received datum is larger than the minimum value MIN (step S2, YES), the value N is stored as MAX=N.

The above process is repeated until the number of times of reception reaches M (step S5, NO). When the number of times of reception reaches M (step S5, YES), the loss rate=$\{(MAX-MIN)-M\}/M$ is obtained (step S6).

That is, the difference between, the difference between the maximum vale MAX and the minimum value MIN of the serial numbers for the number of times of reception M of the data, and the number of times of reception M of the data is the number of the lost data. Therefore, the percentage of the number of times of reception M of the data to the number of the lost data is obtained as the loss rate.

As described above, by applying the present invention, data can be continuously transmitted until the lost data are corrected and the original data can be recovered with the amount of data remained constant even when the line state is degraded. Therefore, a more reliable data communication system can be provided.

While the illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. A data communication system that transmits data through a transmission path between a transmission side apparatus and a reception side apparatus, wherein the transmission side apparatus comprises:
   a coding apparatus to create redundantly-coded data from original data;
   a transmitting apparatus to send the coded data coded by the coding apparatus to the transmission path; and
   a coding rate determining apparatus to set and control a coding rate in the coding apparatus, and
   the reception side apparatus comprises:
   a receiving apparatus to receive the coded data sent through the transmission path;
   a decoding apparatus to decode the coded data received to obtain the original data; and
   a loss rate estimating apparatus to obtain the loss rate on the path of the coded data sent, and wherein
   the coding rate determining apparatus of the transmission side apparatus varies the coding rate in the coding apparatus based on the loss rate obtained, wherein the coding apparatus of the transmission side apparatus obtains solutions by substituting the original data and predetermined constant data into simultaneous equations of Boolean algebra, to determine a combination of the predetermined constant data and the solutions as the coded data, and the decoding apparatus in the reception side apparatus decodes the received coded data to obtain the predetermined constant data and the solutions, and substitutes the obtained, predetermined constant data and the solutions into the simultaneous linear equations to obtain the original data.

2. The data communication system according to claim 1, further comprising:

a data communication controlling apparatus for data transfer through a transmission path between a transmission side apparatus and a reception side apparatus, comprising:

a decoding apparatus to decode coded data received from the transmission side apparatus through the transmission path to obtain original data;

a loss rate estimating apparatus to measure a loss rate on the transmission path of the coded data; and a loss rate transmitting apparatus to send the loss rate to the transmission side apparatus, the sent loss rate being used in a coding rate determining apparatus of the transmission side apparatus for controlling a coding rate as based on the loss rate.

3. The data communication system according to claim 1, further comprising:

a communication controlling apparatus for data transfer through a transmission path between a transmission side apparatus and a reception side apparatus, comprising:

a coding apparatus to create redundantly-coded data from original data;

a coding rate determining apparatus to set and control the coding rate in the coding unit;

a transmitting apparatus to send the coded data to the reception side apparatus;

a loss rate receiving apparatus to receive the loss rate of the coded data from the and reception side apparatus, wherein the coding rate determining apparatus varies and controls the coding rate in the coding apparatus based on the loss rate.

4. The communication system according to claim 1, wherein the coding rate determining apparatus of the transmission side apparatus controls the number of the coded data or the length of a bit string created from the original data and used for the coding to vary a coding rate of the coded data by the coding apparatus.

5. The communication system according to claim 4, wherein, when the loss rate measured by the loss rate estimating apparatus is equal to or smaller than a predetermined value, the coding rate determining apparatus in the transmission side apparatus varies the number of the data bits coded in a manner that the number is increased.

6. The communication system according to claim 5, wherein, when the loss rate exceeds the predetermined value, the coding rate determining apparatus of the transmission side apparatus varies the number of the coded bits in the coding apparatus in a manner that the number is increased.

7. A data transferring method comprising:

in a transmission side apparatus, obtaining solutions by substituting original data and predetermined constant data into simultaneous equations of Boolean algebra, to determine a combination of the predetermined constant data and the solutions, and transmitting the combination of the predetermined constant data and the solutions as coded data to a reception side apparatus;

in the reception side apparatus, decoding received coded data to obtain the predetermined constant data and the solutions, substituting the obtained, predetermined constant data and the solutions into the simultaneous linear equations; further, in the reception side apparatus, obtaining the loss rate on the transmission path of the coded data received; and in the transmission side apparatus, varying a coding rate of the coded data based on the obtained loss rate.

8. The data transferring method according to claim 7, wherein in the step of controlling the number of the coded data or the length of a bit string created from the original data and used for the coding to vary a coding rate of the coded data.

9. Non-transitory computer-readable media included in a transmission side apparatus and a reception side apparatus, wherein:

the non-transitory computer-readable media in the transmission side apparatus storing a program that is executed by the transmission side apparatus to substitute original data and predetermined constant data into simultaneous equations of Boolean algebra to determine a combination of the predetermined constant data and solutions as the coded data, and packet-transmitting the combination of the predetermined constant data and the solutions as coded data to the reception side apparatus, and the non-transitory computer-readable media in a reception side apparatus storing a program that is executed by the reception side apparatus to decode the received coded data to obtain the predetermined constant data and solutions, and substitute the obtained, predetermined constant data and solutions into the simultaneous linear equations, and to obtain the loss rate on the transmission path of the coded data received; and the transmission side apparatus further executes the program therein to vary the coding rate of the coded data based on the obtained loss rate.

10. The non-transitory computer-readable media included in the transmission side apparatus and reception side apparatus according to claim 9, wherein the transmission side apparatus varies the coding rate of the coded data includes the transmission side apparatus controlling the number of the coded data or the length of a bit string created from the original data and used for the coding.

* * * * *